United States Patent [19]
Roeder et al.

[11] 3,799,479
[45] Mar. 26, 1974

[54] LOADING AND UNLOADING EQUIPMENT FOR AIRCRAFT

[75] Inventors: Jean Roeder, Munich; Gerd Cerne, Bremen, both of Germany

[73] Assignee: Vereinigte Flugtechnische Werke-Fokker Gesellschaft mit beschrankter Haftung, Bremen, Germany

[22] Filed: May 31, 1973

[21] Appl. No.: 365,544

[30] Foreign Application Priority Data
June 10, 1972 Germany.......................... 2228395

[52] U.S. Cl............................................ 244/137 R
[51] Int. Cl.............................................. B64d 9/00
[58] Field of Search....... 244/118 R, 237 R; 198/87; 214/83.24, 83.26, 83.34, 85

[56] References Cited
UNITED STATES PATENTS
| | | | |
|---|---|---|---|
| 2,812,867 | 11/1957 | Anderson........................ | 198/87 X |
| 3,282,456 | 11/1966 | Hawes........................... | 214/83.26 X |
| 3,381,921 | 5/1968 | McDonough et al. ...... | 244/137 R X |
| 3,356,236 | 12/1967 | Shaw et al.................. | 244/137 R X |
| 3,478,904 | 11/1969 | Courter..................... | 244/137 R X |
| 3,521,767 | 7/1970 | Rossi............................ | 198/87 X |
| 3,539,067 | 11/1970 | Secrist et al. ............. | 214/83.26 X |

*Primary Examiner*—Duane A. Reger
*Assistant Examiner*—Galen L. Barefoot
*Attorney, Agent, or Firm*—Smyth, Roston & Pavitt

[57] ABSTRACT

On-board loading and unloading equipment for aircraft, the aircraft being equipped for and with pallets movable in the craft along the longitudinal axis, a particular pallet is movably disposed in the cargo space of the craft and provided for being locked in position e.g. in front of the loading hatch in the aircraft; this pallet has a track extending transverse to said aircraft axis, and a carriage moves on the track, and away from the hatch;

a conveyor system is hinged to the carriage and comprised of two hingedly interconnected conveyor belt units, one can be folded under the other one, the latter being hinged to the carriage. The unit which is folded under for storage will be pivoted into alignment in the first phase of protracting and lowering the conveyor system as a whole. The folding and unfolding is carried out as lever linkage follower action.

9 Claims, 5 Drawing Figures

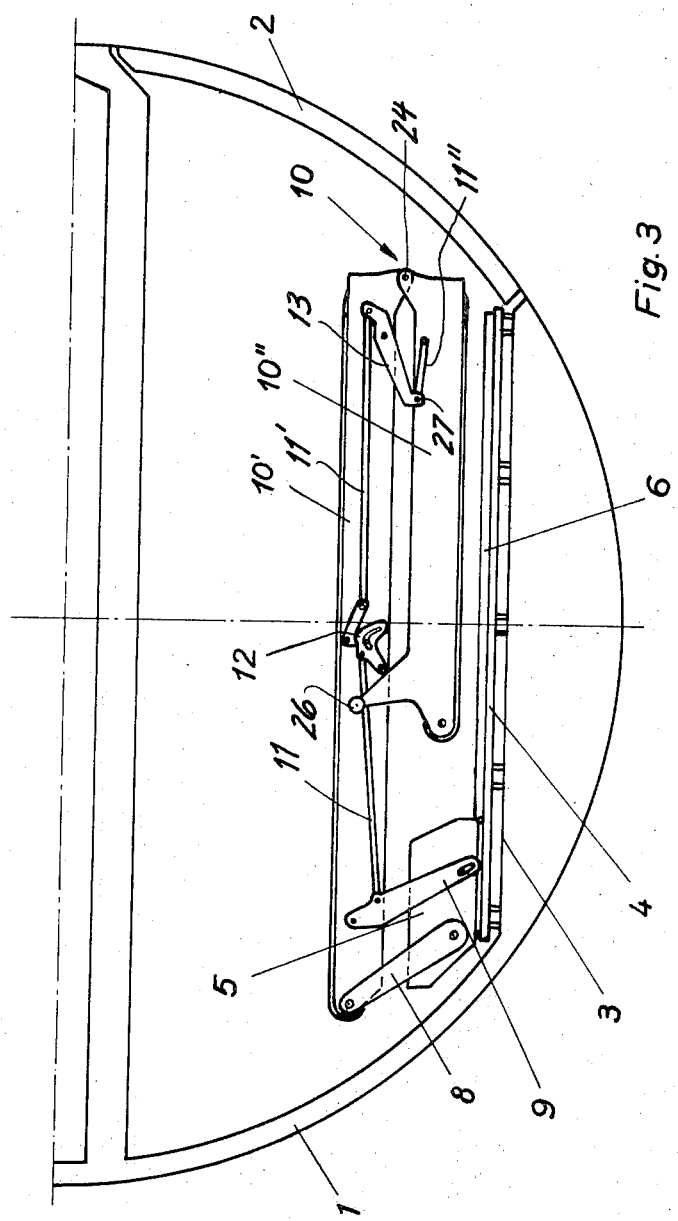

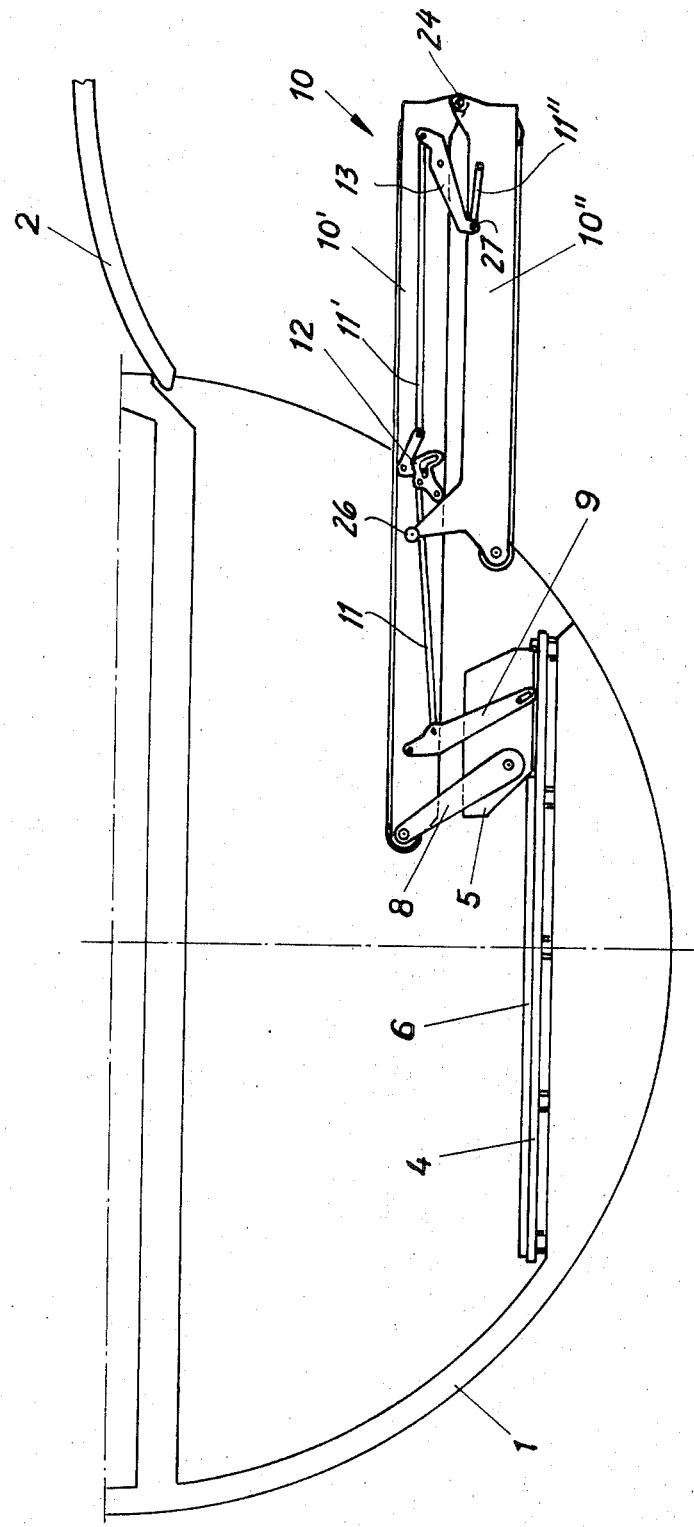

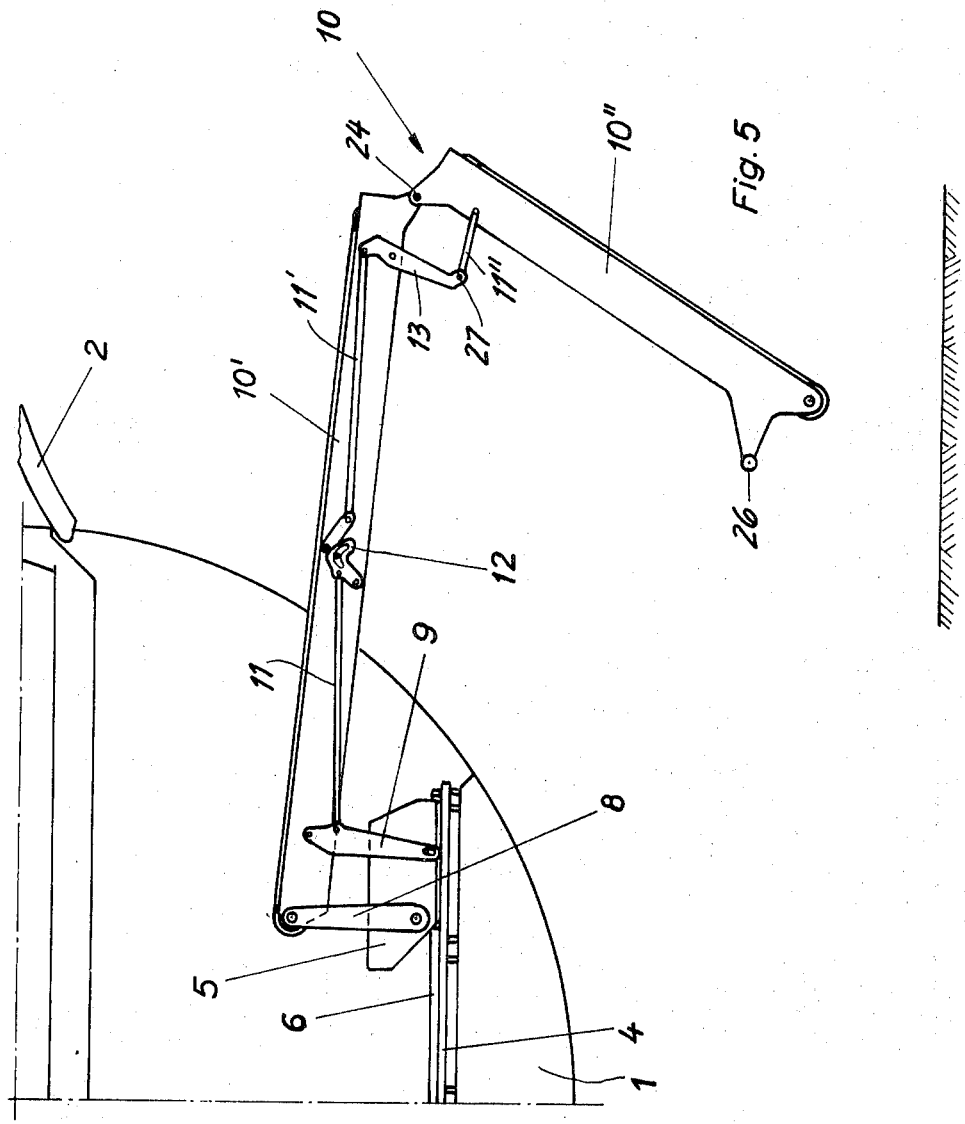

LOADING AND UNLOADING EQUIPMENT FOR AIRCRAFT

BACKGROUND OF THE INVENTION

The present invention relates to on-board loading and unloading equipment for aircraft, preferably for aircraft equipped for pallet and/or container storage with a locking system for such devices.

Utilization of on-board pallets and containers generally serves primarily the purpose of rendering loading and unloading of aircraft independent from surface equipment. This is particularly important for military aircraft, but is generally desirable because airport equipment and facilities vary greatly, and many airports serviced by commercial aircraft are not always well equipped for freight and baggage handling. This, for example, relates particularly to lifting platforms, or the like, often lacking in small airports.

On-board loading equipment for aircraft is known generally, particularly for handling containers. Such equipment includes two obliquely oriented rails which project from the loading hatch down towards ground, and a carriage runs on these rails. The carriage is equipped for holding and locking a container. The two rails each are constructed from sections, hinged together for folding them into the craft. It was found that such equipment is rather complicated and heavy and occupies a significant amount of space. However, it was found that passenger baggage cannot be handled adequately in that manner.

On-board loading devices cooperating with external lifting equipment are, of course, useful only when the airport has such equipment available. However, such facilities cannot operate uninterruptedly. Containers or baggage are first brought to the aircraft, and for example two containers are reeled onto the platform. The platform is then lifted, while in effect the flow of cargo or baggage stops. The containers are then reeled into the aircraft whereupon the platform is lowered again etc. This procedure does not permit an uninterrupted flow of cargo or baggage into the aircraft.

SUMMARY OF THE INVENTION

It is an object of the present invention to provide for on-board loading and unloading equipment which can be used in different type aircraft, is of light weight and does not occupy much space. However, the equipment is to work independently from external equipment, and should move freight or baggage into or out of the aircraft in an uninterrupted flow.

In accordance with the preferred embodiment of the invention it is suggested to use on-board pallet with rails extending transverse to the longitudinal axis of the fuselage. A carriage runs on these rails, particularly towards and away from the/or a loading hatch. Plural conveyor belt units are hinged to each other, one being hinged to the carriage and all units can be folded towards the carriage or unfolded therefrom and extended, and its extended tip can be lowered thereafter to establish a straight line conveyor path of variable inclination. As the multiple unit conveyor system extends down from the carriage when protracted, the farthest conveyor belt unit rests on ground or otherwise but outside of the craft.

The conveyor facility is, thus, part of the aircraft equipment and can be stowed away just as a container or pallet. The carriage carrying pallet should be locked to the bottom of the craft, just as is the usual practice for other pallets and/or containers.

The folded conveyor belt unit or units are linked to the carriage so that they are all unfolded and aligned before the conveyor system is lowered; accordingly the system can be lowered to any elevation, such as ground or a vehicle. The system is provided, preferably, with driven pivot arms for protracting and lowering the unit, and additional control levers and linkage fold and unfold the system in a follower type configuration. Particularly, as the pivot or swing arms move the folded units forward (out of the hatch), the control levers swing, for example, a folded-under unit by about 180° until in alignment with the unit as linked directly to the carriage, and only upon further advance of the swing arms will the aligned units have the front end of the previously folded under unit lowered until coming to rest on any ground support. The control levers should be hinged to the carriage to permit compensation of length variations for different inclinations.

The belts of the units are preferably driven by a common drive on one unit, drivingly linked also to the next one via a transmission that has an axis on the folding axis between the units. The common drive should be a reversable one so that the conveyor system is useful for loading and unloading.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a view similar to FIG. 2 but with the equipment being stowed away and the hatch being closed;

FIG. 4 is a view similar to FIGS. 2 and 3 but for an initial phase of readying the equipment for extension; and FIG. 5 is a view similar to FIG. 4 showing the initial phase of extending and lowering the conveyor system but showing also the progress of unfolding one of the units.

Figure 1:
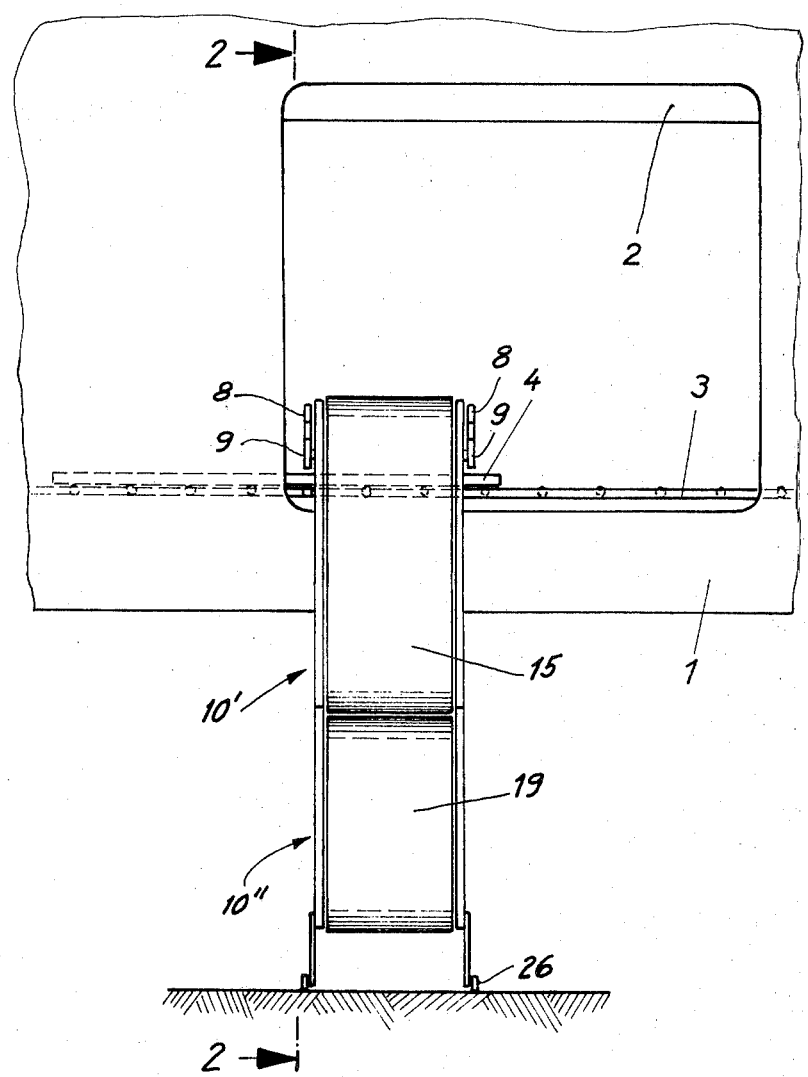
FIG. 1 is a front view of equipment in accordance with the preferred embodiment of the present invention shown as extended through and out of a loading hatch of an aircraft.

Proceeding now to the detailed description of the drawings, the fuselage and body of an aircraft is indicated generally by reference numeral 1 and is illustrated only to the extent necessary to understand the preferred embodiment of the present invention. The fuselage 1 has a loading door or hatch for access to the cargo and baggage storage area in the plane. The bottom 3 inside of the aircraft is specifically provided with roller tracks, balls or other conveyor facilities so that e.g. pallets can move or be moved in the craft along its longitudinal axis (which is parallel to the drawing of FIG. 1.)

A pallet 4 may run on these rollers but can also be locked in position, particularly in front of hatch 2. The pallet 4 is of generally flat configuration and is provided with rails 6 which extend transverse to the longitudinal axis of the plane. A carriage 5 runs on these rails 6 and can, therefore, be moved towards and away from the door or hatch 2, when pallet 4 has a position as shown in FIG. 1.

The carriage 5 carries a combined motor and transmission gear unit 7 for driving a pair of pivot or swing arms 8 so as to turn and lower a conveyor belt system 10 comprised of conveyor belt units 10' and 10". Swing arms 8 are shown in retracted or back position in FIGS. 3 and 4. They are pivoted fully forward in FIG. 2, with FIG. 5 showing an intermediate position. Swing arms 8 are pivotally linked or hinged to the frame and support structure of first conveyor belt unit 10'. In the retracted or back position arms 8 pull unit 10' back onto the carriage as far as possible.

Additionally, a pair of control levers 9 is provided for controlling motion and disposition of belt system 10. Particularly, each lever 9 is hinged and pivotally linked to both carriage 5 and unit 10'. The levers 9 act as follower control elements, responding to a change in disposition of unit 10' as to carriage 5.

The control levers 9 of the pair are disposed respectively to both sides of carriage 5, and rods 11 are linked (hinged) to the levers 9 respectively. The rods 11 are particularly linked respectively to levers 9, so that upon forward motion (forward is towards the hatch) of a lever arm 8 as followed by forward motion of the hinge point of lever 9 on the frame of unit 10', rod 11 is actually pulled back.

Rods 11 (one on each side) are respectively provided at their ends with a member 12 with a curved slot. A coupler pin is received in that slot and guided therein. The pin is coupled to another rod 11', so that a slight pulling by rod 11 is translated into a larger pulling stroke of rod 11'.

A shift lever 13 is pivotally linked to the upper conveyor unit 10' and in the lower portion thereof. Shift lever 13 is connected to and actuated by rods 11', and shift lever 13 is additionally hingedly connected to (hinge pin 27) and actuates another rod 11", there being a pair of these rods 11' accordingly because the entire rod and lever mechanism is duplicated on the other side, as can be derived from FIG. 1.

The conveyor unit 10' is comprised of an endless belt 15 which runs over a drive pulley 16, a reversing roller 17 and support rollers 18. The drive roller or pulley 16 is driven by a motor 14 which is part of unit 10' and held in the frame in which the several rollers of the unit 10' are journalled.

The lower conveyor unit 10" is hinged to unit 10' (hinge axis 24) and is also comprised of an endless belt 19 running over a drive pulley or roller 20, a reversing roller 21 and support rollers 22. The drive pulley 20 is connected through chains 23 to drive motor 14 so as to be driven therefrom. The two chains 23 are drivingly interconnected through sprocket wheels on a common shaft on hinge and folding axis 24 of the two units 10',10" of conveyor system 10. It should be noted that by means of the common drive both belts 15 and 19 run at the same speed.

Figure 2:
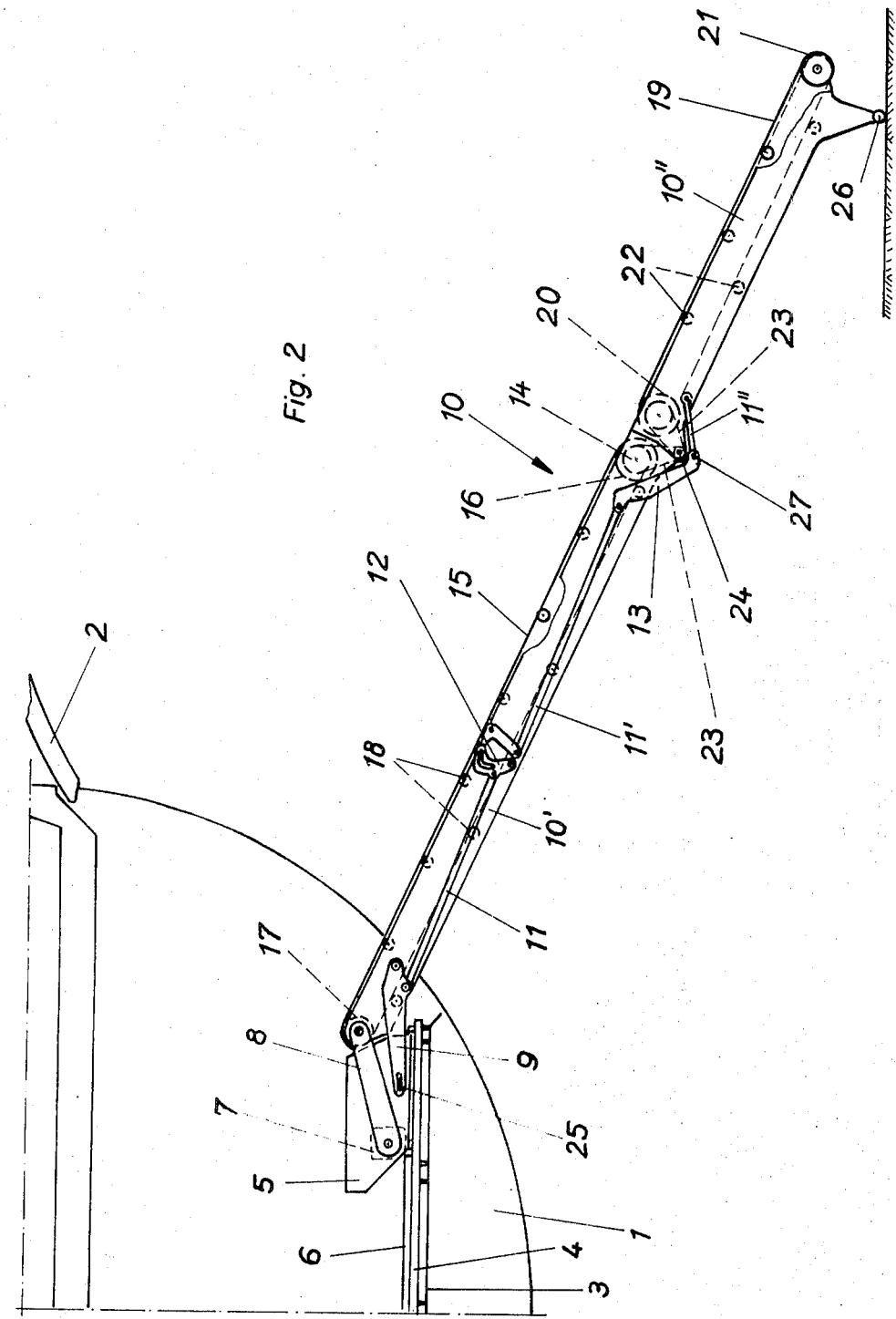
FIG. 2 is a section view along line 2—2 in FIG. 1, showing the equipment itself in side view.

FIG. 2, as stated shows the inventive equipment in fully protracted and extended disposition of mutual alignment of units 10' and 10". FIG. 3 shows the same equipment fully retracted and folded whereby particularly unit 10" is folded under longer unit 10', the latter being partially on carriage 5. FIGS. 4 and 5 show, in that order, stages of the transition from the disposition of the equipment shown in FIG. 3 to the fully extended position of FIG. 2.

As can be seen from comparison of the several figures, extending the equipment begins with moving carriage 5 and rails 6 towards hatch or door 2 (FIG. 4). Now FIGS. 4 and 5 should be carefully compared. As the drive 7 turns swing arms 8 clockwise, control lever 9 follows that motion, levers 8 and 9 as well as carriage and part of unit 10' establish approximately a parallelogram. Turning of lever 8 shifts unit 10' off the carriage, while lever 9 pulls rod 11 back so that lever 13 turns and folds unit 10" by turning the unit 10" counterclockwise about hinge axis 24, and for a total of about 180°. Thus, control-drive system 9-11-12-11'-13-11' moves to unfold unit 10", and pivots same about hinge axis 24, until the load bearing surfaces of units 10 and 10" become aligned. The two units 10' — 10" are actually aligned before the entire system 10' has its end or tip (as established by support rolls 26 at the end of unit 10") lowered. During the last phases of swing arm (8) pivoting, the aligned conveyor system 10 is inclined until feet rolls 26 come to rest on any available support. That may be the ground outside of the aircraft, or a loading vehicle, a platform i.e. any object whose height above ground is not, so to speak, a fixed system parameter as to the level of support for feet rolls 26.

Any level difference in support is taken up in the slot-pin hinge arrangement 25 by means of which control levers 9 are pivotally linked to carriage 5.

For folding the conveyor system back, swing arms 8 are just turned back so that the top of teh conveyor system is lifted, and the follower motor of levers 9 causes the unit 10" to be folded under unit 10', after the tip end of the unit 10' has lifted sufficiently high above ground.

In certain cases, the external support may be quite high above ground, so that one does not need the entire length of the conveyor system. Thus, it is advisable to provide removable bolts in the hinge points 24 of the two units 10',10" and one should also decouple the drives as well as lever 13 from roll 11" by removing hinge pin 27 so as to remove unit 10" entirely. The end of the conveyor system is then provided by the front or free end of unit 10', and levers 13 serve as support feet.

The invention is not limited to the embodiments described above but all changes and modifications thereof not constituting departures from the spirit and scope of the invention are intended to be included.

We claim:

1. On-board loading and unloading equipment for aircraft, the aircraft being equipped for and with pallets movable in the craft along the longitudinal axis, there being a particular movable pallet provided for being locked in position e.g. in front of a loading hatch in the aircraft, comprising:

means for defining a track on the particular pallet, the track extending transverse to said axis;
a carriage on the track, movable thereon towards and away from the hatch;
a conveyor system on the carriage, and comprised of plural hingedly interconnected conveyor belt units, a first one thereof being hinged to the carriage, a second one thereof provided with means for resting on the ground outside the aircraft;

first means for folding the units together and for unfolding the units so that they extend in mutual alignment; and second means for operating on the first unit for raising and lowering the conveyor system, the means for resting on the second unit coming to rest external to the craft when the system is lowered by the second means.

2. Equipment as in claim 1, the second means including at least one pivot arm hinged on the carriage and pivotally linked to the first unit, thereby hingedly connecting the first unit to the carriage; the first means including at least one control lever pivoting on the carriage and linked to the first unit.

3. Equipment as in claim 1, the first means being follower operated upon active operation of the second means.

4. Equipment as in claim 3, the first means including plural lever means interconnected and connected to the units for unfolding the units and aligning them in the initial phases of protracting and lowering the system as a whole.

5. Equipment as in claim 4, the first means including at least one control lever on the carriage for operating the lever means during lowering by the second means.

6. Equipment as in claim 5, the second means including at least one pivot arm pivotally linked to the first unit and holding the first unit on the carriage, parallel to the particular pallet, when the system if folded, the pivot arm moving the first unit off the carriage for unfolding whereby the control lever and the lever means pivot the second unit by 180°.

7. Equipment as in claim 5, the control lever provided with a slot for length compensation.

8. Equipment as in claim 1, the units of the plurality provided with a common drive and transmission means for linking elements to the common drive.

9. Equipment as in claim 8 wherein the first and second units have a common folding and hinging axis, the transmission means using the hinging axis for transmitting motion from one of the first and second units to the respective other one.

* * * * *